(12) United States Patent
Beard et al.

(10) Patent No.: US 6,404,618 B1
(45) Date of Patent: Jun. 11, 2002

(54) ELECTROLYTIC CAPACITOR OPERABLE AS AN A/C CAPACITOR

(75) Inventors: Kenneth D. Beard, Glasgow; Robert Borton, Cave City, both of KY (US)

(73) Assignee: Yosemite Investment Co. Inc., Indianapolis, IN (US)

( * ) Notice: Subject to any disclaimer, the term of this patent is extended or adjusted under 35 U.S.C. 154(b) by 0 days.

(21) Appl. No.: 09/706,551

(22) Filed: Nov. 6, 2000

(51) Int. Cl.[7] ............................................. H01G 9/042
(52) U.S. Cl. ...................... 361/509; 361/502; 361/503; 361/508; 361/529; 252/62.2
(58) Field of Search ................................ 361/509, 433, 361/508, 529, 322, 502, 503, 505, 525, 527, 504; 252/62.2

(56) References Cited

U.S. PATENT DOCUMENTS

| | | | | |
|---|---|---|---|---|
| 4,024,442 A | * | 5/1977 | Anderson ................... | 361/322 |
| 4,164,779 A | * | 8/1979 | Lauer et al. ................ | 361/433 |
| 4,376,713 A | * | 3/1983 | Dunkl ........................ | 252/62.2 |
| 4,437,945 A | * | 3/1984 | Sells et al. .................. | 204/35 |
| 5,143,591 A | * | 9/1992 | Shaffer ....................... | 205/50 |

* cited by examiner

Primary Examiner—Dean A. Reichard
Assistant Examiner—Nguyen Ha
(74) Attorney, Agent, or Firm—Robert F. Meyer

(57) ABSTRACT

An aluminum electrolytic capacitor which has the capacity to operate at a constant A/C voltage as long as the capacitor is energized. The aluminum foil used in the capacitor is an amorphous oxide which causes the oxide to be "fluffy" such that the oxide stacks up and becomes thicker. The aluminum foil is of the heavy-duty type exceeding the specification of EIA RS463.

2 Claims, 2 Drawing Sheets

ELECTROLYTIC CAPACITOR OPERABLE AS AN A/C CAPACITOR

FIELD OF THE INVENTION

The present invention relates to an electrolytic capacitor and more particularly to such a capacitor that is able to operate continuously as an AC capacitor.

BACKGROUND OF THE INVENTION

The capacitor of the present invention is particularly useful in motor start and motor run applications. In such applications when a power switch is turned on a motor start capacitor energizes to start the motor. Such capacitor is of the electrolytic type. When the motor gets up to a predetermined speed, a switch turns the motor start capacitor off, and the motor run capacitor remains energized. Such capacitor is an electrostatic capacitor capable of operating continuously in AC applications. Such a capacitor would normally operate at from 1 to 80 mfd.

SUMMARY OF THE INVENTION

According to the present invention there is provided an electrolytic capacitor capable of operating at a constant A/C. The term "constant" is herein meant to mean that the capacitor is operating at a constant A/C voltage for as long the capacitor is energized.

DETAILED DESCRIPTION

Figure 1:
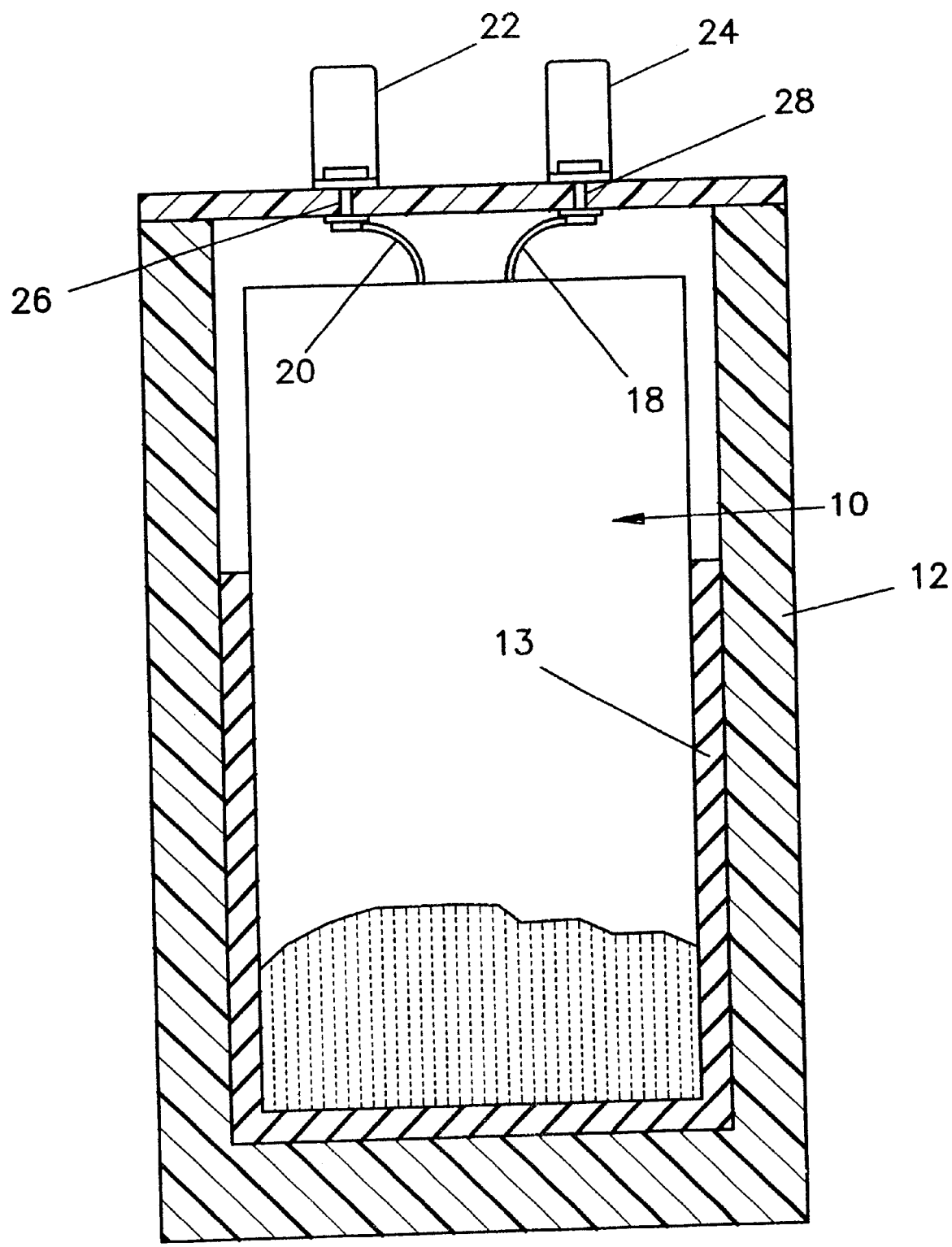
FIG. 1 is a cross section of an electrolytic capacitor employing the features of the invention.
Figure 2:
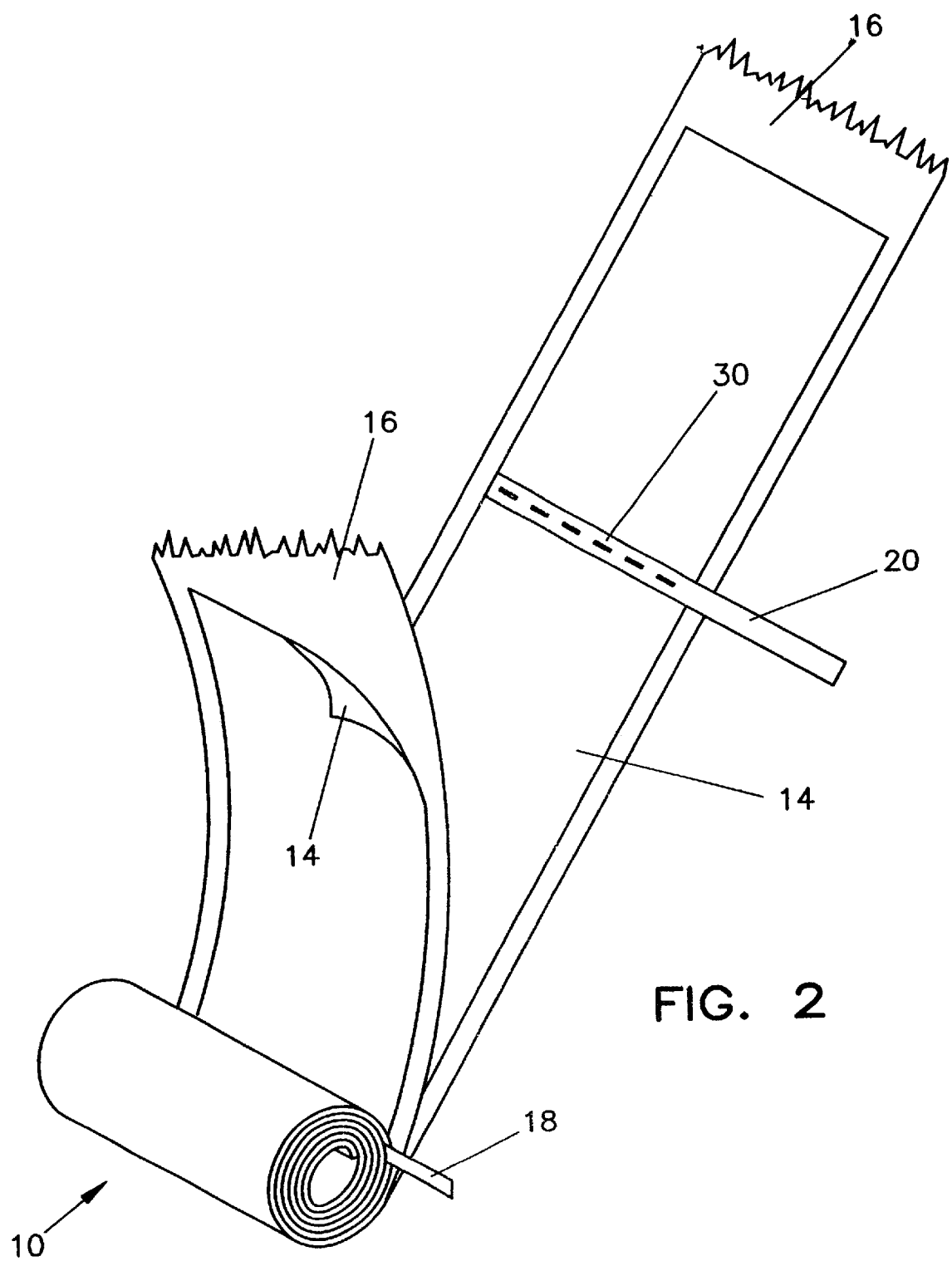
FIG. 2 is a view showing the wound aluminum foil used in the capacitor.

Referring now to the drawings there is shown a convolutely wound capacitor body 10 carried in a container 12. The body is held in place in the container by a potting of tar 13. Capacitor body or cartridge 10 includes an aluminum foil 14 interwound with an absorbent material 16 such as paper and impregnated with a liquid electrolytic such as a compounded mixture consisting principally of ethylene glycol and boric acid. Electrical terminal wires or electrical tabs 18 and 20 extend from the body 10 and are electrical connected to electrical terminals 22 and 24 through some suitable means such as rivets 26 and 28. The tabs are held in place by stitches 30.

In accordance with the present invention, an electrolytic capacitor capable of operating at a constant AC voltage is provided by a proper selection of aluminum foil 14. It has been determined that the foil should be of the "heavy duty" type; that is, it should exceed the specification of EIA RS463.

Further, it has been determined that that an amorphous oxide aluminum foil should be used. The amorphous causes the oxide to become "fluffy" since the oxide stacks up and becomes thicker. This provides a better barrier for the prevention of electrons penetrating through the oxide during capacitor use, which would result in a loss of power.

An example of such aluminum foil would be Becromal S099, manufactured by Becromal Company of Milan, Italy.

In forming the foil for actual capacitor use, sheets of foil are cut to a required width. The resulting cut edges must then be reformed to withstand the voltage applied to the capacitor. For this reason when the original sheets are formed a formation voltage must be applied to the aluminum. For example, for the present application a formation voltage of about 400 volts would be acceptable.

The following is an example of the use of the present electrolytic capacitor.

EXAMPLE

A capacitor was fabricated in accordance with the invention using aluminum foil Becromal S099. The capacitor had a rating of 5 uF at 240 volts AC. It was connected in an electrical circuit to simulate being used as both an AC motor start and a motor run capacitor. A voltage of 336 volts AC (1.4 x rated) was applied to the capacitor for one second to simulate the start cycle of the motor. After this normal start cycle, the voltage was reduced to 324 volts AC (1.35 x rated). EIA-463-A specifies a motor start capacitor maximum over-voltage condition of 140% of rated voltage for one second. EIA-456-A specifies a motor run capacitor life test of 120 hours at 135% of rated voltage. The capacitor was maintained at this constant voltage for 120 hours at 80 degrees C. to simulate the run cycle of the motor.

Prior to this invention, under these conditions, a second AC electrostatic capacitor would have had to be incorporated in the electrical circuit to simulate the motor run cycle.

What is claimed is:

1. A single aluminum electrolytic capacitor operable both as an A/C motor start and A/C motor run capacitor whereby an A/C motor can be started when an A/C voltage is applied to said aluminum electrolytic capacitor and continuously run at a constant A/C voltage by said aluminum electrolytic capacitor as long as said aluminum electrolytic capacitor is energized.

2. An aluminum electrolytic capacitor according to claim 1 having a body of aluminum foil interwound with an absorbent material, the aluminum foil being an amorphous oxide.

* * * * *